(12) United States Patent
Green

(10) Patent No.: US 11,733,206 B2
(45) Date of Patent: Aug. 22, 2023

(54) MULTIPLEXING METHOD FOR SEPARATORS

(71) Applicant: Micromass UK Limited, Wilmslow (GB)

(72) Inventor: Martin Raymond Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 350 days.

(21) Appl. No.: 16/493,967

(22) PCT Filed: Mar. 14, 2018

(86) PCT No.: PCT/GB2018/050653
§ 371 (c)(1),
(2) Date: Sep. 13, 2019

(87) PCT Pub. No.: WO2018/167487
PCT Pub. Date: Sep. 20, 2018

(65) Prior Publication Data
US 2020/0080967 A1      Mar. 12, 2020

(30) Foreign Application Priority Data
Mar. 14, 2017   (GB) ...................... 1704018

(51) Int. Cl.
*G01N 27/624*      (2021.01)
*H01J 49/00*      (2006.01)
(Continued)

(52) U.S. Cl.
CPC ......... *G01N 27/624* (2013.01); *G01N 27/623* (2021.01); *H01J 49/0031* (2013.01);
(Continued)

(58) Field of Classification Search
None
See application file for complete search history.

(56) References Cited

U.S. PATENT DOCUMENTS 9,406,493 B2   8/2016   Verenchikov
2006/0024720 A1   2/2006   McLean et al.
(Continued)

FOREIGN PATENT DOCUMENTS

WO   2015/173577 A1   11/2015
WO   WO-2015173577 A1 *  11/2015   ........... G01N 27/622

OTHER PUBLICATIONS

Search Report for GB Application No. GB1704018.9, dated Jul. 20, 2017.
(Continued)

*Primary Examiner* — Andrew Smyth
(74) *Attorney, Agent, or Firm* — Goodwin Procter LLP

(57) ABSTRACT

The present disclosure provides a method comprising providing a sample to be analysed, separating successive populations of ions from said sample in a separator, wherein said populations of ions are introduced into said separator at regular intervals, and the intervals are timed such that at least some ions in a subsequent population of ions overlap ions in a preceding population of ions, varying one or more parameters of said separator such that different populations of ions experience different separation conditions, detecting ions from said populations of ions and obtaining a convolved data set, and de- convolving said convolved data set using the known variance of the parameters and outputting data corresponding to the successive populations of ions.

16 Claims, 6 Drawing Sheets

(51) Int. Cl.
  *H01J 49/22* (2006.01)
  *H01J 49/40* (2006.01)
  *G01N 27/623* (2021.01)

(52) U.S. Cl.
  CPC .......... *H01J 49/0036* (2013.01); *H01J 49/22* (2013.01); *H01J 49/401* (2013.01); *H01J 49/406* (2013.01)

(56) References Cited

U.S. PATENT DOCUMENTS

| | | |
|---|---|---|
| 2009/0294644 A1 | 12/2009 | Belov |
| 2012/0074066 A1 | 3/2012 | Sun et al. |
| 2013/0161506 A1 | 6/2013 | Ugarov |
| 2015/0219598 A1* | 8/2015 | Mordehai ........... H01J 49/0031 250/282 |
| 2016/0086762 A1* | 3/2016 | de Jong ................ H01J 37/285 250/305 |
| 2016/0198994 A1* | 7/2016 | Murphy ................. A61B 5/445 600/477 |
| 2016/0225602 A1* | 8/2016 | Ristroph ............... H01J 49/009 |
| 2016/0276130 A1* | 9/2016 | Mele ........................ H04N 5/32 |

OTHER PUBLICATIONS

Combined Search and Examination Report for GB Application No. GB1804083.2, dated Sep. 11, 2018.
International Search Report and Written Opinion for International Application No. PCT/GB2018/050653, dated Jun. 21, 2018.
Belov, M.E., et al., "Multiplexed Ion Mobility Spectrometry-Orthogonal Time-of-Flight Mass Spectrometry", Anal. Chem., 79:2451-2462, Mar. 15, 2007.
Knorr, F.J., et al., "Fourier Transform Time-of-Flight Mass Spectrometry", Anal. Chem., 58:690-694 (1986).
Knorr, F.J., et al., "Fourier Transform Ion Mobility Spectrometry", Anal. Chem., 57:402-406, Feb. 1985.
Zare, R.N., et al., "Hadamard Transform Time-of-Flight Mass Spectrometry: More Signal, More of the Time", Angew. Chem. Int. Ed., 42(1):30-35 (2003).

* cited by examiner

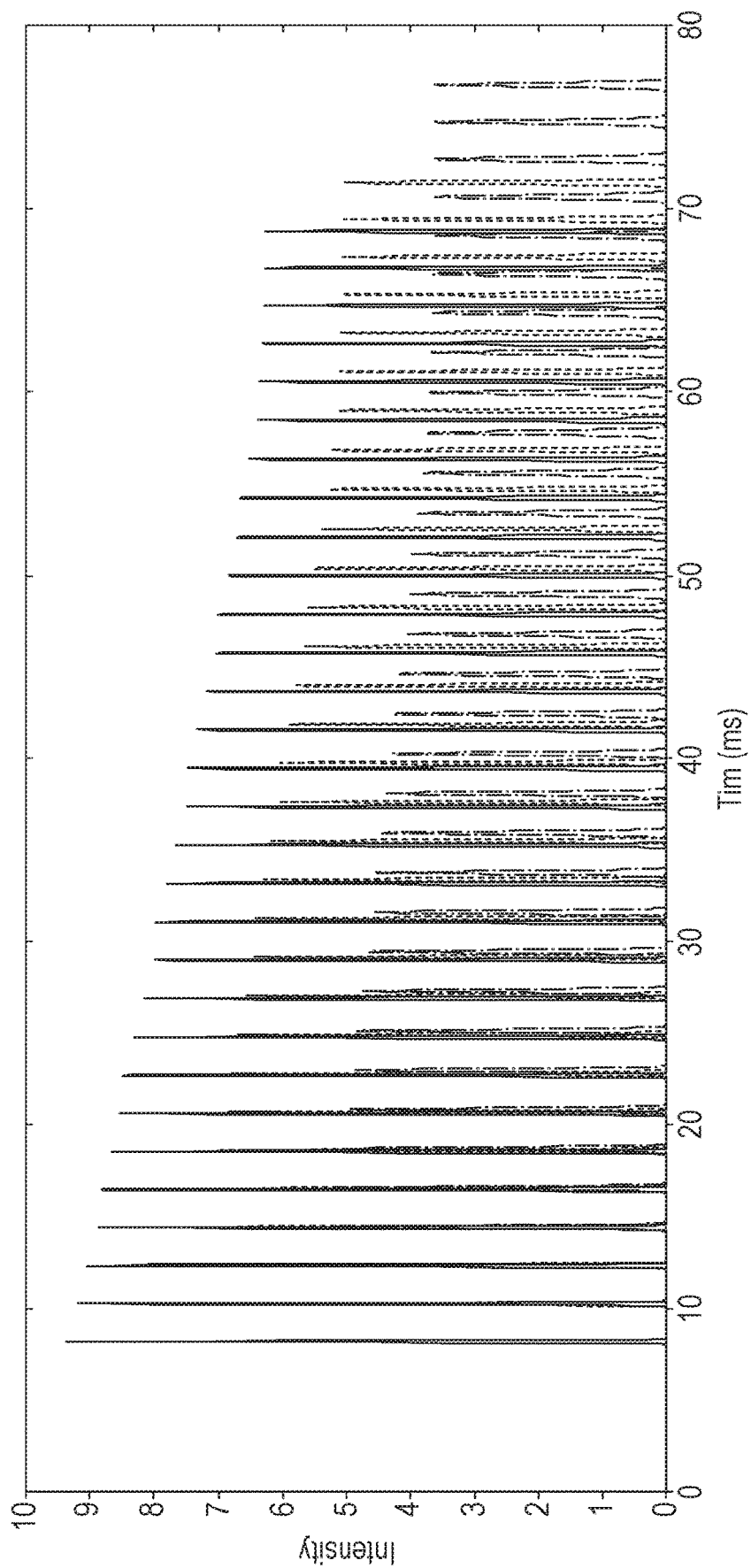

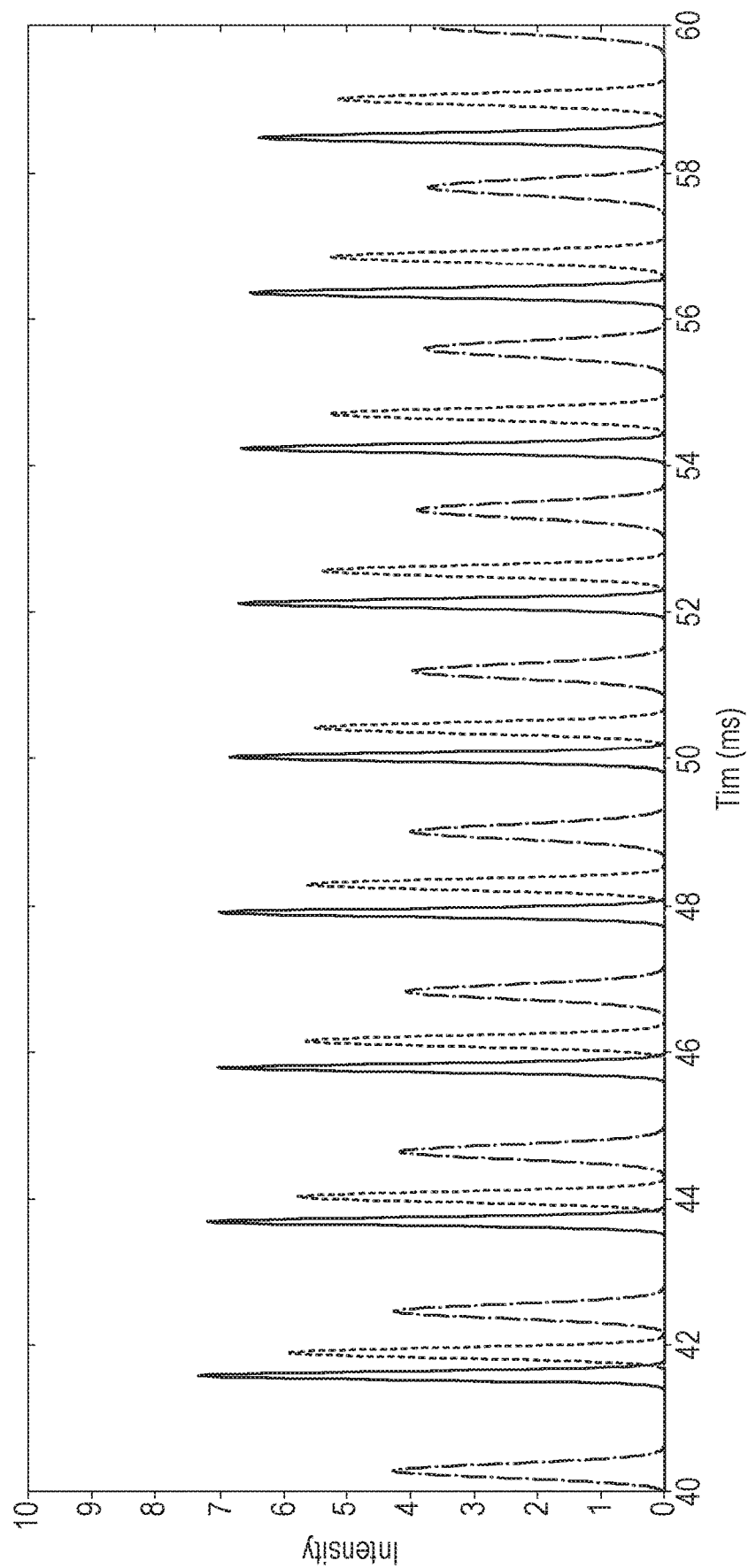

MULTIPLEXING METHOD FOR SEPARATORS

CROSS-REFERENCE TO RELATED APPLICATIONS

This application is a national phase filing claiming the benefit of and priority to International Patent Application No. PCT/GB2018/050653, filed on Mar. 14, 2018, which claims priority from and the benefit of United Kingdom patent application No. 1704018.9, filed Mar. 14, 2017. The entire contents of these applications are incorporated herein by reference.

FIELD OF THE INVENTION

The present invention relates generally to mass spectrometers and in particular to ion separators for use in mass spectrometry, such as ion mobility separators, mass to charge ratio separators and methods associated with the same.

BACKGROUND

Ion separation devices employing multiplexing methods to improve the duty cycle and/or reduce space charge effects are known. In these approaches, multiple populations of ions are introduced into a separation region during the analytical separation time.

Anal. Chem. 2007, 79, 2451-2462, entitled "Multiplexed Ion Mobility Spectrometry-Orthogonal Time-of-Flight Mass Spectrometry" describes such a method applied to an ion mobility spectrometer instrument having an accumulation region prior to the ion mobility separation region, and an analytical time of flight instrument afterwards. In this method ions are released into the ion mobility separation region in a pseudo random sequence such that the time between release pulses varies.

Fourier transform time of flight ("FT-IMS") and ion mobility spectrometry ("IMS") are also well known. FT-IMS is a multiplexing technique in which ions are gated into and out of an IMS cell by two gates at either end of an ion mobility separator. The gating waveform is generally identical on both gates and the frequency of the gating signal is swept or stepped. The amplitude of the output for an ion of specific mobility, although discontinuous, varies as a substantially periodic function with a frequency characteristic of the mobility of each species present. Conversion of this data usually by Fourier transform (FT) yields an IMS drift time spectrum.

U.S. Pat. No. 9,406,493 (Verenchikov) describes a method of multiplexing to increase the duty cycle of a time of flight analyser. In this case the delay time between pulses of ions entering the time of flight region is varied deterministically by a method called 'encoded frequency pulsing'. The multiplex data recorded is subsequently decoded to produce a mass spectrum.

US 2006/0024720 (McLean) discloses a method of multiplexing packets of ions, wherein different groups of ions having different experimental parameters may be superimposed on each other, and encoded using their frequency of introduction.

Hadamard time of flight mass spectrometry uses multiplexed ion pulse interval encoding to increase the duty cycle of mass measurement.

Conventional multiplexing methods involve encoding the output signal by gating or pulsing of ions into or within the device by varying the offset time between the introductions of different populations of ions into the separation region. In these devices the characteristics of the separator itself is typically invariant.

It is desired to provide an improved method of separating ions.

SUMMARY

According to an aspect of the present disclosure, there is provided a method comprising:

providing a sample to be analysed;

separating successive populations of ions from the sample in a separator, wherein the populations of ions are introduced into the separator at predefined intervals, and the intervals are timed such that at least some ions in a subsequent population of ions overlap ions in a preceding population of ions;

varying one or more parameters of the separator such that different populations of ions experience different separation conditions, for example such that each successive population of ions experiences different separation conditions;

detecting ions from the populations of ions and obtaining a convolved data set; and de-convolving the convolved data set using the known variance of the parameters and outputting data corresponding to the successive populations of ions.

The populations of ions may be introduced into the separator at a first frequency or in a first pattern. The first frequency or first pattern could be predefined or otherwise determinable. The populations of ions may exit the separator at a second frequency or in a second pattern (which may be determinable from the convolved data set), and the second frequency or second pattern will be different to the first frequency or first pattern (respectively) due to the variance of the separation parameters through the device. In this situation it is not possible to de-convolve using only the frequency or pattern of introduction of the populations of ions, since this changes between the inlet and outlet of the separator. The deconvolution may use both the frequency or pattern of introduction (if necessary) and at least the known variance of the parameters.

In other words, the separation conditions are changing for each population of ions, so the frequency or pattern at which the populations exit the separator will be changing all the time. As such, according to these embodiments ions may be encoded not only by the frequency or pattern of introduction, but at least also by the known variance of the parameters.

The method may be a method of separating and optionally analysing ions.

As described above, the parameters of the separator may be varied (in the varying step), e.g., continuously such that each population of ions experiences different average separation conditions. In other words, no two populations of ions experiences the same separation conditions throughout their separation. For any given population of ions the parameters of the separator may be varied during their separation. This allows each individual population of ions to be identified through the de-convolving step.

The step of varying comprises varying one or more parameters of the separator, e.g., continuously such that each successive population of ions experiences different separation conditions. Optionally, each population of ions experiences different separation conditions to the populations of ions that immediately precede and follow it.

The parameters of the separator may be varied (in the varying step) progressively, e.g., gradually increased or decreased, for example during a single experimental run and/or cycle of separation and/or throughout the separation of the successive populations of ions. The parameters of the separator may be varied in this manner continuously. The one or more parameters may be varied at a frequency that is at least greater than or equal to the frequency of introduction of the populations of ions into the separator.

The predefined intervals are optionally regular intervals, such that the time between each successive population of ions being separated (and/or introduced into the separator) is uniform. Such methods provide an improvement over conventional multiplexing methods, which do not typically introduce ions into a separator at regular intervals, or vary the separation conditions for each population of ions, allowing de-convolution of the data.

The predefined intervals may alternatively be non-regular intervals, such that the time between each successive population of ions being separated (and/or introduced into the separator) is non-uniform.

The step of varying may result in ions of each population experiencing different average separation conditions, which may be defined by the separation parameters set for the period in which each population of ions is being separated in the separator. The term "average separation conditions" is used to reflect that the separation conditions may be changing whilst any given population of ions is being separated in the separator. The term "separation parameter" may refer to any parameter of the separator that substantially affects the transit or elution time of ions being separated.

The one or more parameters may substantially affect the transit (e.g., elution) time of ions through the separator. Any suitable parameter may be used, including those described herein and others that function in this manner. In other words, the parameters to be varied should be those that affect the separation of the ions as they travel through the separator.

Each successive population of ions may contain at least some of the same analyte compounds. The data corresponding to the successive populations of ions may comprise the mass and/or mobility peaks of the analyte compounds. The data corresponding to the successive populations of ions may comprise drift time and/or intensity and/or mass to charge ratio data of the analyte compounds. It will be appreciated that the methods described herein relate to a method of multiplexing successive populations of ions, and the step of deconvolving the convolved data set is aimed at extracting data (e.g., drift time, intensity, mass to charge ratio data) of a certain ion species (e.g., analyte compound) from the combined or convolved data set.

The step of de-convolving the convolved data set may comprise using a forward modeling method, such as an iterative forward modeling algorithm. Such an algorithm may comprise: (i) modifying the amplitude and/or frequency of at least some of the model signals, (ii) superimposing the modified model signals, (iii) comparing the resulting composite signal to the signal output from the detector, and (iv) calculating a goodness of fit between the composite signal and the ion signal output from the detector; wherein steps (i)-(iv) are repeatedly performed in an iterative manner until a termination criterion is satisfied, or until the goodness of fit between the composite signal and the ion signal output from the detector is within said predetermined probability or tolerance. The termination criterion may be maximum likelihood, maximum entropy, or maximum a posteriori (MAP).

The known variance of the parameters is used to de-convolve the convolved data set. This may be in addition (or alternatively) to the frequency or pattern of introduction of the population of ions. In this manner, the populations of ions input into the separator are encoded at least by the different separation conditions that they experience as they travel through the separator (as discussed above). The variance of the parameters throughout the separation may be recorded during the separation or otherwise known (e.g., predefined or predetermined).

The method may further comprise determining the ion mobility and/or collision cross section of ions from the data corresponding to the successive populations of ions.

The separator may be an ion mobility separator.

The one or more parameters may comprise one or more of driving force, a voltage of the separator (e.g., driving DC voltage), temperature of the separator (e.g., within the separator), buffer gas velocity, buffer gas composition and buffer gas pressure.

The ion mobility spectrometer may be a travelling wave ion mobility spectrometer comprising a plurality of electrodes. One or more transient DC voltages or potentials may be applied to at least some of the electrodes in order to urge ions in a first direction through the ion mobility spectrometer to create a DC travelling wave. The one or more parameters may comprise an amplitude and/or velocity of the DC travelling wave.

The method may further comprise mass analysing the ions prior to the step of detecting the populations of ions, wherein the convolved data set comprises ion mobility data nested with mass spectral data.

The one or more parameters may comprise an applied DC field strength. The data corresponding to the successive populations of ions may comprises a drift time measurement for one or more analyte compounds taken at different average field strengths.

The method may further comprise determining a value of collision cross section for each of the analyte compounds using a plot of the drift time measurements against the reciprocal of the average field strength.

The separator may be configured to separate ions according to their mass to charge ratio.

The separator may be an orthogonal time of flight mass analyser, and the one or more parameters may comprise a voltage associated with the orthogonal time of flight mass analyser that substantially affects the time of flight of ions in the orthogonal time of flight mass analyser.

The voltage may comprise a pusher and/or reflectron voltage.

According to an aspect of the present disclosure, there is provided an apparatus for separating and analysing ions, the apparatus comprising an ion separator, a detector and a control system, wherein the control system is arranged and adapted to:

separate successive populations of ions from a sample, and introduce the populations of ions into a separator at regular intervals, wherein the intervals are timed such that at least some ions in a subsequent population of ions overlap ions in a preceding population of ions;

vary one or more parameters of the separator such that different populations of ions experience different separation conditions;

detect ions from the populations of ions and obtain a convolved data set; and de-convolve the convolved data set using the known variance of the parameters and outputting data corresponding to the successive populations of ions.

According to an aspect of the present disclosure, there is provided a method for analysing analytes introduced into a spectrometer, the method comprising:

releasing analytes into the spectrometer at regular intervals during which time the separation conditions of the spectrometer are changed in a known manner;

detecting the analytes at a detector wherein some of the analyte signals are overlapping;

de-convolving the detected signal based on the known characteristics of the spectrometer under the conditions of operation for each release of analyte ions to produce a de-convolved spectrum.

The spectrometer may be an RF-confined ion mobility separator optionally comprising a pre-accumulation trapping region.

A time of flight mass analyser may be provided downstream of the ion mobility separator, for example to produce a nested IMS-MS data set.

The spectrometer may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The ion-molecule reaction device may be configured to perform ozonlysis for the location of olefinic (double) bonds in lipids.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

Optionally, in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

Optionally, in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene.

A chromatography detector may be provided, wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

The electrodes may comprise electrodes which are formed on a printed circuit board, printed wiring board or an etched wiring board. For example, according to various embodiments the electrodes may comprise a plurality of traces applied or laminated onto a non-conductive substrate. The electrodes may be provided as a plurality of copper or metallic electrodes arranged on a substrate. The electrodes may be screen printed, photoengraved, etched or milled onto a printed circuit board or equivalent. According to an embodiment the electrodes may comprise electrodes arranged on a paper substrate impregnated with phenolic resin or a plurality of electrodes arranged on a fibreglass mat impregnated within an epoxy resin. More generally, the electrodes may comprise one or more electrodes arranged on a non-conducting substrate, an insulating substrate or a plastic substrate. According to embodiments the plurality of electrodes may be arranged on a substrate.

A plurality of insulator layers may be interspersed or interleaved between an array of electrodes. The plurality of electrodes may be arranged on or deposited on one or more insulator layers.

BRIEF DESCRIPTION OF THE DRAWINGS

Various embodiments will now be described, by way of example only, and with reference to the accompanying drawings in which:

FIG. 3A shows a mass-mobility spectrum based on a model for a varying DC field ion mobility separator in accordance with the present disclosure, and FIG. 3B shows a smaller portion of FIG. 3A.

DETAILED DESCRIPTION

There is disclosed a method comprising providing a sample to be analysed and separating successive populations of ions from the sample in a separator. The populations of ions are introduced into the separator at regular intervals, and the intervals are timed such that at least some ions in a subsequent population of ions overlap ions in a preceding population of ions. The method includes varying one or more parameters of the separator such that different populations of ions experience different separation conditions, for example such that each successive population of ions experiences different separation conditions. The method further includes detecting ions from the populations of ions and obtaining a convolved data set. The method further comprises de-convolving the convolved data set using the known variance of the parameters and outputting data corresponding to the successive populations of ions.

The populations of ions may be generated from the same sample, and may have substantially the same composition. Each population of ions may comprise one or more of the same analytes, optionally in substantially the same concentration. The data corresponding to the successive populations of ions may comprise data for each analyte.

As discussed above and herein, and generally, successive populations (or packets) of ions are pulsed at regular intervals into a separation device and the conditions of separation are varied (e.g., continuously or in steps) as the successive populations of ions are introduced. Thus, different populations of ions may experience different average separation conditions. If the average separation conditions (and, hence, elution time) for ions of different properties in the different ion populations is known or otherwise determined (e.g., by pre-calibration) the complex multiplexed data produced (e.g., the convolved data set) may be de-convolved to give a simplified data set representing the elution characteristics of various species present. Any suitable method of deconvolution may be used, including those described below.

As packets of ions are introduced continuously at regular intervals a larger number of ion packets may be introduced into the separator per unit time, which can maximise the duty cycle or overall space charge capacity compared to the prior art.

In the case of multiplexed ion mobility separation, coupling the ion mobility separator with a high resolution time of flight mass analyser can be used to produce a nested IMS-MS data set, which may simplify the de-convolution process.

Figure 1:
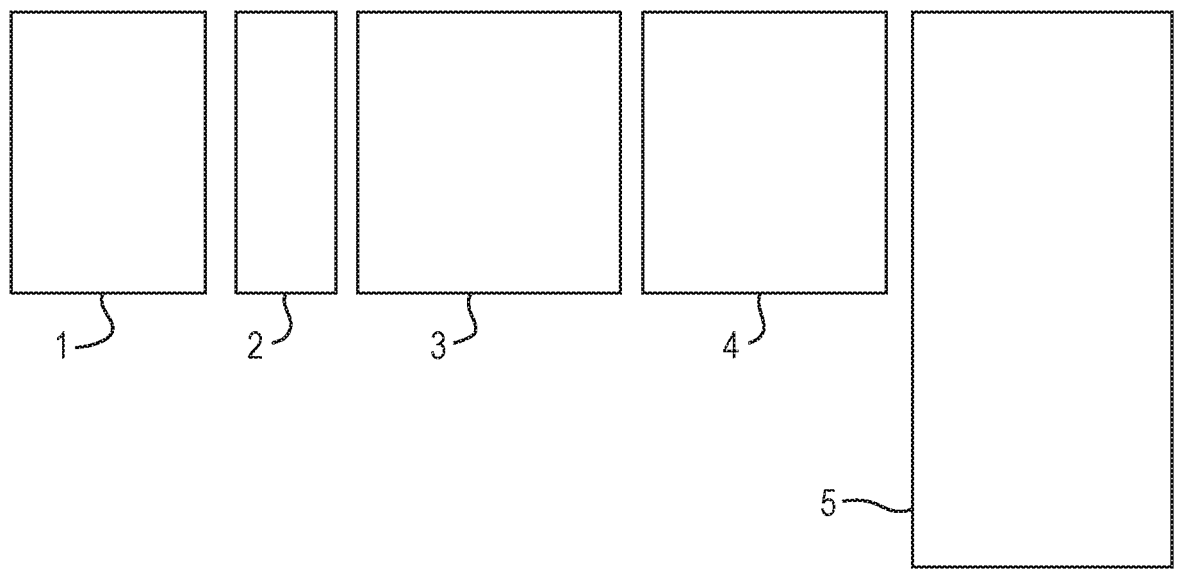
FIG. 1 shows an arrangement of a mass spectrometer.

FIG. 1 shows a block diagram of a mass spectrometer incorporating an ion mobility separation device.

Ions may be produced in an ion source (1) and may be trapped within ion accumulation region (2). Ion populations that have accumulated in the ion accumulation region (2) may be periodically released into an ion mobility separation region (3), where they may separate according to their ion mobility. The populations of ions may be introduced into the separator at regular intervals, and the intervals may be timed such that at least some ions in a subsequent population of ions overlap ions in a preceding population of ions. In other words, the populations of ions may intermix at the detector, or otherwise overlap, such that the detected signal comprises a convolved data set.

The separated ions may then pass through one or more optional components (4) (e.g., a quadrupole mass filter and/or collision or reaction cell) before passing into an optional mass analyser (5), which may be an orthogonal acceleration time of flight mass analyser. The ions can then be detected and analysed.

The output signal response at the detector of the mass analyser (5) was modeled for a situation in which the ion mobility separation region (3) comprised a linear field ion mobility separation device with a drift length of 1 m, and at a pressure of 3 torr of Nitrogen. In the model, ion packets are released from the ion accumulation region (2) every 2 ms from 0 ms to 60 ms.

Three ion species were present in each modeled ion packet, including:

Mass 350, $z_1$, ccs=164.7 Å2, K=0.0355 m$^2$/V/s,

Mass 700, $z_2$, ccs=231.5 Å2, K=0.0495 m$^2$/V/s, and

Mass 1050, $z_3$, ccs=276.8 Å2, K=0.0617 m²/V/s, where "z" denotes the charge on the ion, "ccs" denotes the collision cross section, and "K" denotes the ion mobility.

In the model, peak profiles are represented by a Gaussian shape with a standard deviation proportional to the expected diffusion for each ion at the pressure modeled. For the above species the $z_2$ ion is 2 ms slower than the $z_3$ and the $z_1$ ion is 6 ms slower than the $z_3$. Over 1 m for a 2 kV field, drift times were 8.1, 10.1 and 14.1 ms for $z_3$, $z_2$ and $z_1$ respectively.

The three species described above have identical m/z values and so cannot be distinguished by mass spectrometry. It should be recognized that this modeled situation results in a 'worst case' situation for a multiplexing technique of the type described.

Figure 2A:
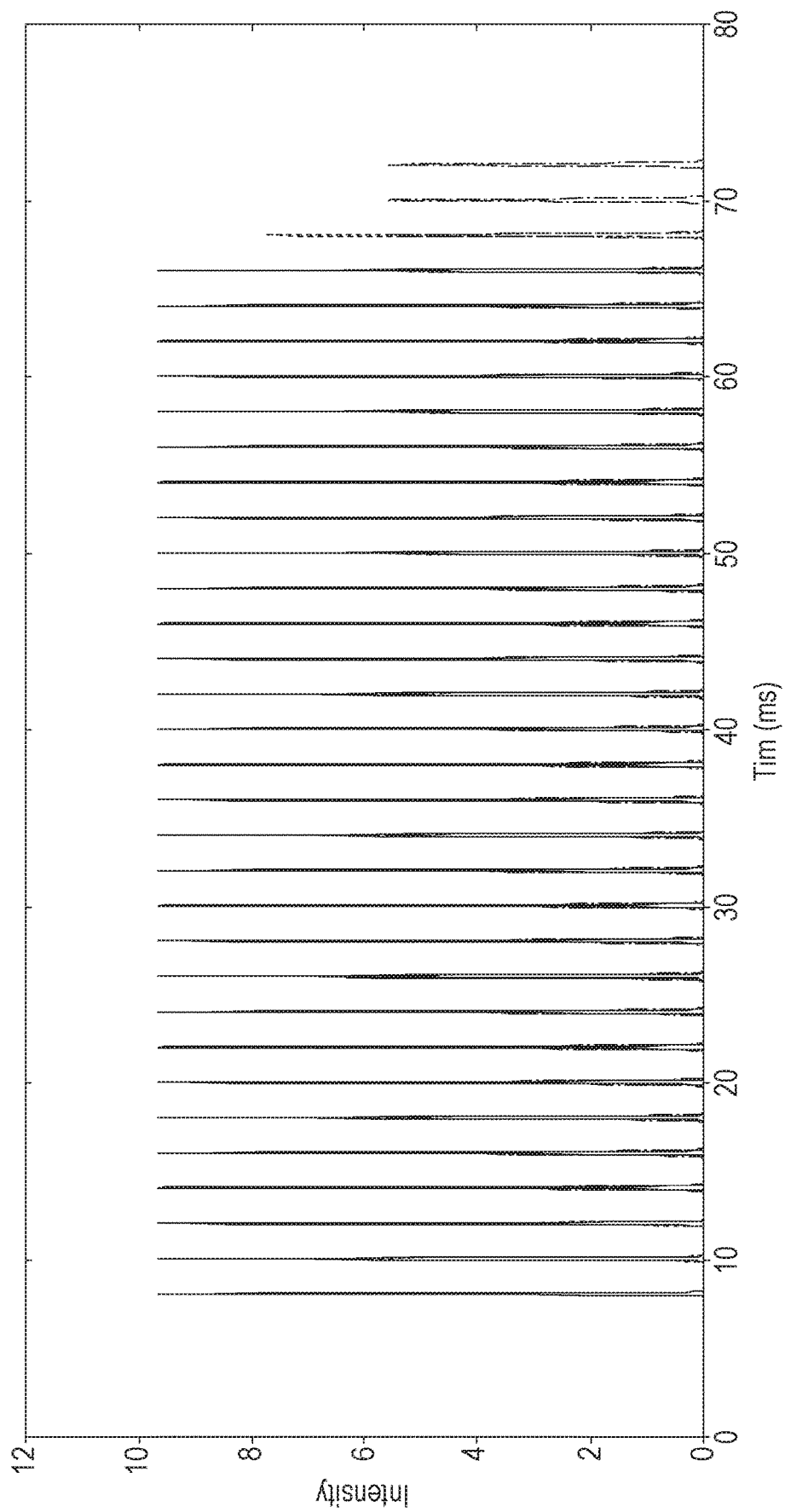
FIG. 2A shows a mass-mobility spectrum based on a model for a fixed DC field ion mobility separator.
Figure 2B:
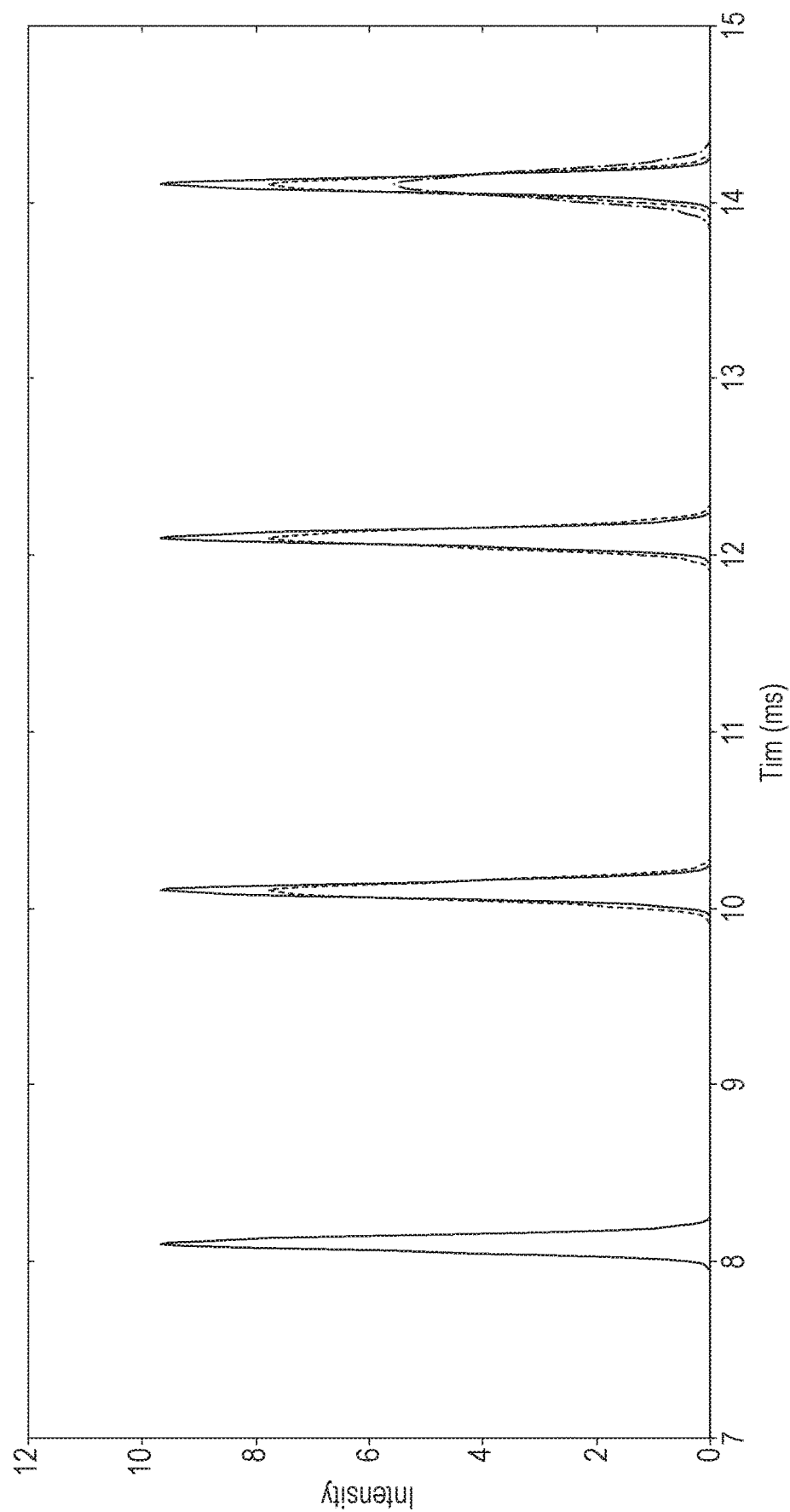
FIG. 2B shows a smaller portion of FIG. 2A.

FIGS. 2A-2B show a reconstructed mass-mobility spectrum or elution profile, of m/z 350, with a fixed linear DC field. FIG. 2A shows the entire mass-mobility spectrum for the sequence of ion introductions described.

As used herein, the reconstructed mass-mobility spectrum corresponds to the signal recorded at the detector within a narrow region of the mass spectrum corresponding into the ion of interest (in this case around a mass to charge ratio of 350).

For a nested ion mobility-time of flight data set, this data may be generated by summing the intensities within the narrow region of the time of flight mass spectrum, and plotting the summed intensities as a function of elution time. This reduces the three dimensional data (including drift time, mass to charge ratio, and intensity) to a two dimensional spectrum comprising just drift time and intensity.

The three species are shown as separate peaks for clarity. In reality, as the m/z values are identical, the output of the reconstructed mass-mobility spectrum would comprise the sum of the signal intensities for each species.

Under these conditions the three species co-elute for the majority of the ion mobility separation time. This may be seen as a worst case where de-convolution would be impossible or very inaccurate.

FIG. 2B shows a small portion of the elution profile illustrating the overlap of these three species. Under these conditions it is very difficult or impossible to de-convolve these three species to calculate the drift time and/or collision cross section for each of the species.

Figure 3C:
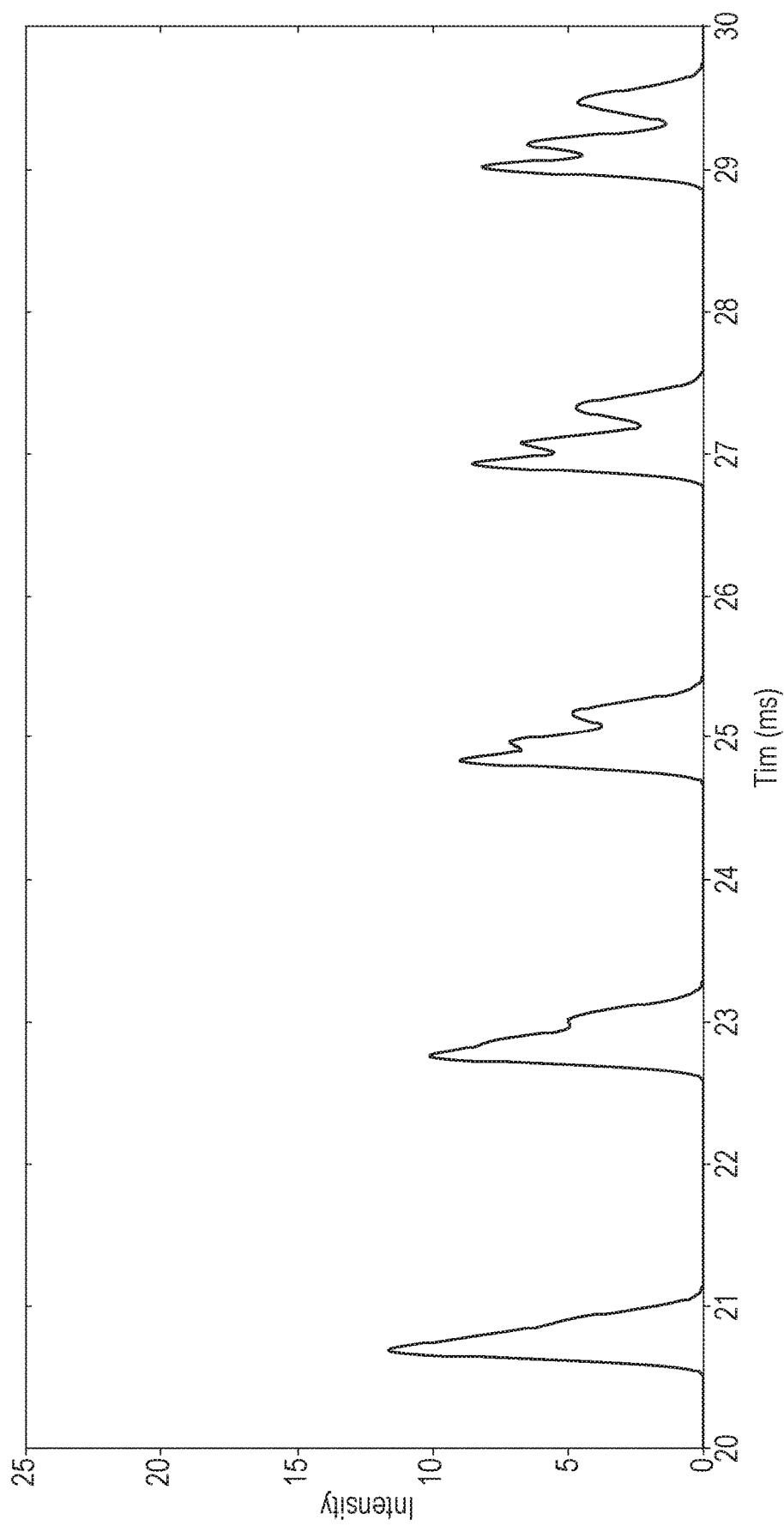
FIG. 3C shows a smaller portion of FIG. 3A but with the ion species summed to represent the expected profiles of recorded data.

FIGS. 3A-3C shows a reconstructed mass-mobility spectrum, of m/z 350 in the same model as described above and in relation to FIGS. 2A-2B, but a varying DC field is provided in place of a fixed DC field. In this model, the linear DC field ramps down (in 21 steps) from 2 kV/m to 1.5 kV/m over 60 ms.

FIG. 3A shows the entire elution profile for the sequence of ion population introductions into an ion mobility separator (e.g., the ion mobility separation region (3) of FIG. 1).

FIG. 3B shows a small portion of the elution profile illustrating the change in the relative elution times of the three species as the acquisition sequence proceeds. In FIGS. 3A and 3B, the three species are shown as separate peaks for clarity. In reality, the profile of recorded data will summed, and FIG. 3C shows portion of the elution profile with the signal from the three species summed to more accurately represent such an expected profile of the recorded data.

In FIGS. 3A-3C the average field experienced by each population of ions introduced into the device may be different and, in contrast to the conditions of FIG. 2, the extent of the overlap between the signals from the three species may progressively change as the experiment proceeds.

Based on the known parameters of the separator, and in accordance with the disclosure, the resulting complex data set or convolved data set may de-convolved to determine the ion mobility, and hence collision cross section of each component.

The step of de-convolving the convolved data set may comprise one or more known de-convolution techniques, including methods based on forward fitting of model data such as non-negative least squares, maximum likelihood (least squared), maximum entropy, Bayesian (probabilistic) methods and filter diagonalisation. Such methods may be known in the art as "forward modeling methods".

In various embodiments, the multiplexed ion mobility data may be coupled with time of flight mass spectrometry to produce an ion mobility-mass spectrometry ("IMS-MS") data set. The mass to charge ratio resolution of time of flight mass spectrometry can allow simplification of the ion mobility spectrum for each mass to charge ratio range. Each mass to charge ratio region of the IMS-MS data set may be de-convolved separately, or the entire data set (e.g., a 3D data set comprising mass to charge ratio, drift time and intensity) may be de-convolved as a multi-dimensional array. The known correlation between mass to charge ratio, charge state and ion mobility may be used to assist or guide the de-convolution algorithm, which can speed up the processing time.

The step of de-convolving the convolved data set may comprise using a forward modeling method, such as an iterative forward modeling algorithm. Such an algorithm may comprise: (i) modifying the amplitude and/or frequency of at least some of the model signals, (ii) superimposing the modified model signals, (iii) comparing the resulting composite signal to the signal output from the detector, and (iv) calculating a goodness of fit between the composite signal and the ion signal output from the detector; wherein steps (i)-(iv) are repeatedly performed in an iterative manner until a termination criterion is satisfied, or until the goodness of fit between the composite signal and the ion signal output from the detector is within said predetermined probability or tolerance. The termination criterion may be maximum likelihood, maximum entropy, or maximum a posteriori (MAP).

The iterative process may be a Markov Chain Monte Carlo method or a nested sampling method, producing samples from a probability distribution where each sample represents a possible reconstruction of the data.

The deconvolution technique may comprise a least squares or non-negative least squares algorithm, or a filter diagonalisaltion method.

In forward modeling methods, it is desired to determine a set of model signals, corresponding to particular ion mobility values, that when superimposed match the experimentally observed signals generated by the ion mobility separator. The method iterates different combinations of modeled signals having differing ion mobilities and amplitudes until the best match for the experimentally obtained signal is determined. The model signals making up the best match are then used to determine the ion mobilities and intensities of the ions.

Such methods have previously been too computationally intensive to be of practical application, however, advances in computational electronics and methods have made these techniques more practical.

In addition, the coupling of the multiplexed IMS device with mass spectrometry facilitates application of these forward fitting techniques with practical timescales. For example, a correlation between mass to charge ratios of the ions and the drift times may be known or determined and used to simplify the modeling process. In particular, the mass to charge ratios of the ions may be determined and the correlation may then be used to determine the drift times of the ions that would be expected under the conditions of the multiplexed separation. The forward modeling need then only model signals having characteristics that correspond to the expected drift times of the ions. Other model signals need not be considered as they would correspond to drift times of ions that are not present. This process significantly simplifies the modeling. The mass to charge ratios may be determined by mass analysing the ions downstream of the IMS device and/or by providing a mass filter upstream of the IMS device that mass selectively transmits only certain ranges of mass to charge ratios.

Forward fitting of model data may be applied to each narrow mass to charge ratio region in which far fewer species exist and therefore the signal is greatly simplified resulting in more precise results in far shorter timescales. The model data may be obtained from calibration standards or sufficiently pure species within the analyte.

In an ion mobility separator, the ion mobility peak widths will typically be slightly wider for ions experiencing lower linear DC driving potential. This deterministic difference or progression of difference in ion mobility peak line width and/or maximum intensity may also be used to assist deconvolution and can be incorporated into the model data.

The effect of continuously varying a DC field in an ion mobility separator as successive ion populations are introduced may be considered analytically, and an example is set out below.

The velocity with respect to time of an ion of mobility K in a changing electric field E(t) is given by:

$$u(t) = E(t) \cdot K \tag{1}$$

Considering a linear field change the field is given by:

$$E(t) = E_0 + bt \tag{2}$$

where $E_0$ is the initial field.

By substitution:

$$u(t) = (E_0 + bt) \cdot K \tag{3}$$

By integration, the position of an ion within the separator at time t is given by:

$$x(t) = K\left(E_0 t + \frac{bt^2}{2} + C\right) \tag{4}$$

as the position of the ions within the ion mobility separator x=0 at time t=0 the integration constant C=0.

The time taken for ions to exit the device of length L is $t_L$, and:

$$x(t_L) = L \tag{5}$$

as well as:

$$x(t_L) = K\left(E_0 t_L + \frac{bt_L^2}{2}\right) \tag{6}$$

Therefore:

$$L = K\left(E_0 t_L + \frac{bt_L^2}{2}\right) \tag{7}$$

Equation (7) may be rewritten as:

$$0 = KE_0 t_L + K\frac{bt_L^2}{2} - L \tag{8}$$

The solution to this quadratic equation is:

$$t_L = \frac{E_0}{b}\left[-1 \pm \sqrt{1 + \frac{2 \cdot L \cdot b}{E_0^2 \cdot K}}\right] \tag{9}$$

The solution for which the driving field does not reverse direction is:

$$t_L = \frac{E_0}{b}\left[-1 + \sqrt{1 + \frac{2 \cdot L \cdot b}{E_0^2 \cdot K}}\right] \tag{10}$$

Considering n multiple injections of ions with an interval between injections of $\Delta t$ the field experienced by the nth ion will be:

$$E(t) = E_0 + n \cdot b \cdot \Delta t + b \cdot t \tag{11}$$

Defining the initial field for each of the n ion packets as:

$$E_0(n) = E_0 + n \cdot b \cdot \Delta t \tag{12}$$

The time from injection to elution for each of the n injections is given by:

$$t_n = \frac{E_0(n)}{b}\left[-1 + \sqrt{1 + \frac{2 \cdot L \cdot b}{E_0(n)^2 \cdot K}}\right] \tag{13}$$

However, the measured arrival times (At) are recorded relative to the injection of the first packet of ions in the sequence. Therefore the observed drift times for the n injections of ions is given by:

$$At_n = t_n + n \cdot \Delta t \tag{14}$$

and:

$$At_n = \frac{E_0(n)}{b}\left[-1 + \sqrt{1 + \frac{2 \cdot L \cdot b}{E_0(n)^2 \cdot K}}\right] + n \cdot \Delta t \tag{15}$$

Re-Arranging for K yields:

$$K = \frac{2b \cdot L}{(E_0(n) + b(At_n - n \cdot \Delta t))^2 - E_0(n)^2} \tag{16}$$

In combination with a down-stream analyser there is often a mass to charge ratio dependent offset, D(m/z), in the measured ion mobility arrival times due to the time of flight of ions from the exit of the ion mobility separator to the detector.

This may be included in the expression above to give.

$$K = \frac{2b \cdot L}{(E_0(n) + b(At_n - n \cdot \Delta t - D(mz)))^2 - E_0(n)^2} \tag{17}$$

Operating an ion mobility separation device in this manner may be analogous to the 'direct' method that collision cross section values can be calculated, that is using a linear field ion mobility separation device. In the direct method a series of separate ion mobility separations are performed for the same analyte, at different field strengths and a plot of drift time against the reciprocal of the linear field strength can be used to determine the time offset D(mz). Through knowing the buffer gas pressure, temperature, drift length and field strength, mobility and hence collision cross section may be calculated using the known Mason-Schamp equation:

$$K = \frac{3}{16} \frac{q}{N} \sqrt{\frac{2\pi}{\mu kT}} \frac{1}{\Omega} \qquad (18)$$

where q is the charge on the ion, N is the drift gas number density, $\mu$ is the reduced mass, T is the gas temperature and k is Boltzmann's constant.

If the same analyte is present in each of the populations of ions introduced into the separator in the manner described in this disclosure, a series of drift time measurements for that analyte can be produced at different average field strengths, since each population of ions will experience a different average field strength.

This information may be used along with the known parameters of the ion mobility separator to directly calculate collision cross section for that particular analyte. The average field strength for each of the n injections $Eav_n$ is given by:

$$Eav_n = \frac{b * t_n}{2} + E_0(n) \qquad (19)$$

Therefore:

$$(At_n - n\Delta t) = \frac{L}{Eav_n K} \qquad (20)$$

As indicated in equation (20), the recorded arrival time adjusted for the introduction delay ($At_n - n\Delta t$) may be plotted against the reciprocal of the calculated average field strength (calculated from the arrival time for each packet of ions recorded at the detector in sequence), multiplied by the length of the device (L). From this plot, the time offset D(mz) may be determined from the intercept of the straight line produced, and the mobility from the gradient of the line. Hence, the collision cross section of a particular species may be determined directly from a single series of multiplexed injections of the same analyte.

The disclosed technology may therefore provide a rapid method of producing data for calculation of collision cross section for a particular analyte or multiple analytes. In combination with time of flight mass spectrometry, sufficient mass resolution may be provided to allow reconstructed mass-mobility chromatograms of individual species to be generated from simple mixtures. The disclosed method can therefore provide data for 'direct' measurement of collision cross section in chromatography time scales.

In various embodiments, any parameter affecting ion separation may be altered instead of, or in addition to the driving force in an ion mobility separator. For example, where there is a counter flow of buffer gas one or more of its velocity, pressure and composition may be altered during the separation, for example between introduction of each population of ions into the separator.

The separator may be a travelling wave ion mobility separator, for example comprising a plurality of electrodes, wherein one or more transient DC voltages or potentials are applied to at least some of the electrodes in order to urge ions in a first direction through the ion mobility spectrometer (i.e., to create a DC travelling wave). A control system may be arranged and adapted to apply the one or more transient DC voltages or potentials to the plurality of electrodes so that said successive populations of ions are translated along the ion mobility separator with a given velocity.

The travelling wave parameters (velocity, amplitude) may be altered to change the elution times of different ion populations. Pre-calibration of mobility and drift time for ions of known mass to charge ratio and ion mobility may be performed under each condition for single pulses at the appropriate point in the ion mobility separation cycle and this information may be used to produce model data to use in the subsequent de-convolution or decoding.

It is recognised that introducing a series of populations of ions into a travelling wave ion mobility separation device while the travelling wave is on may, in some cases, cause losses in transmission of ions. This is because some ions entering the travelling wave device may experience the leading edge of a transient DC pulse as they enter the separation region. This leading edge may either prevent ions from entering the separation region or cause ions to be accelerated out of the entrance region in a reverse direction.

In a non-multiplexing mode, this problem may typically be overcome by interrupting the travelling wave while ions are injected into the separation region. The travelling wave amplitude is typically set to zero for a time between 100 µs and 500 µs. During this time ions can enter far enough into the device that they only experience a forward driving force. In addition, sufficient DC potential gradient may be applied between the upstream accumulation region and the ion mobility separation region to overcome any adverse effects from the transient DC voltage. The amplitude of the travelling wave may also be ramped from a low to a higher value during the experiment such that the amplitude is at the lowest value at the point ions are injected into the separator.

In multiplexed operation it is possible, although undesirable to interrupt the travelling wave or drop the wave amplitude at the point each ion packet is introduced. This may be undesirable as it can be more difficult to optimise the separation conditions of ions if the driving force is reduced discontinuously at such regular intervals.

Referring back to FIG. 1, the separator may be a travelling wave ion mobility separator, and a DC potential gradient may be applied when introducing a population of ions in order to urge that population of ions from the accumulation region (2) to the ion mobility separation region (3), and this DC potential gradient may be increased. However, in some cases this can lead to unwanted rises in the energy of the ions, which can lead to fragmentation.

An optimal method may be to arrange for the amplitude of the travelling wave in a first, upstream portion of the ion mobility separation region (3) (e.g., an entrance region) to be relatively low, and then increase in amplitude along some proportion, for example 5%, 10%, 20%, 30%, 50%, 75% or 100% of the length of the device.

The amplitude of the travelling wave in the first, upstream portion (e.g., an entrance region) of the ion mobility separation region (3) may remain invariant such that every ion population experiences the same, relatively low amplitude of the DC travelling wave as they enter the separator. Once ions are driven away from or leave the first, upstream portion (e.g., an entrance region) the travelling wave amplitude may be restored or increased. The amplitude and/or velocity of the DC travelling wave and/or the overall driving force may be varied between successive populations of ions as described, but not in the first, upstream portion.

It should be noted that the methods disclosed herein may be used regardless of the multiplexing scheme utilised. For example, encoding the delay between introductions of ion packets without varying the travelling wave separation parameters in a manner described in the prior art in relation to separators using DC fields.

In various embodiments, the parameters may be ramped or changed continuously, or in a series of steps.

In the example provided in respect of FIGS. 3A-3C ion populations may be pulsed into the separator (e.g., 30 pulses at 2 ms apart). At the end of the sequence of pulses time may be allocated for the lowest mobility ion of the final pulse to elute. This can reduce the overall duty cycle of the experiment as during most of this time no ions are accumulated in the upstream trap to avoid space charge saturation.

In various embodiments the ion introduction sequence may run continuously and the DC field or other parameter may be ramped back to its original value after a predetermined number (e.g, greater than 10, 20 or 30) of populations of ions have been introduced into the ion mobility separation region (3), while the data corresponding to the successive populations of ions may comprise multiple two dimensional IMS-MS spectrums (each corresponding to the predetermined number of populations of ions), and/or ion mobility data may continuously be acquired in a single large data set. In these embodiments no inter-scan delay or minimal inter-scan delay may be required maximizing duty cycle.

In various embodiments described above, a monotonically changing DC field is described, however other non-monotonic changes to the ion mobility separation parameters may be envisaged. As used herein, a monotonically changing DC field may correspond to a field that is always either increasing or decreasing during the analysis and does not reverse direction during the experiment. For example, the field may be decreased for part of the sequence, maintained at a constant value for part of the sequence and increased for part of the sequence. The increases and/or decreases in the applied field may be non-linear.

Generally, as long as the relationship between the average field experienced by each population of ions and their mobility is known (or otherwise generated) the data may be de-convolved into a single spectrum (e.g., ion mobility spectrum) as described above.

The methods disclosed herein may be applied to any ion separator, and are not limited to ion mobility separators. For example, a mass to charge ratio separator may benefit from the broadest aspects of the present disclosure. An example is an orthogonal time of flight mass to charge ratio ("TOF") separator, which may comprise a pusher electrode arranged and adapted to pulse successive populations of ions into the TOF separator, and/or a reflectron arranged and adapted to reflect ions that are pulsed into the TOF separator.

In this disclosure, the interval between successive populations of ions being introduced into the separator is substantially constant, and the parameter to be varied may comprise a pusher electrode voltage and/or reflectron voltage, and/or other voltage associated with the TOF separator. The parameter may be a parameter of the TOF separator that substantially affects the time of flight of ions in said orthogonal time of flight mass analyser. Similar methods of de-convolution as disclosed above may be used.

In embodiments where the separator is a mass to charge ratio separator, the apparatus and/or control system thereof may be configured such that the mass to charge ratio resolution of the separator does not substantially or appreciably change over the range of the parameter that is varied. Pre-calibration of the time of flight of ions in the populations of ions, e.g., using pure standards may be used to construct a model for de-convolution and to maintain the mass measurement accuracy of the de-convolved data.

As a further example, the methods disclosed herein may be used in capillary electrophoresis chromatography. Capillary Electrophoresis may be described as liquid phase ion mobility separation, so the separator as described generally herein may be a capillary tube filled with an electrolyte solution. The parameter to be varied may be the magnitude of the electric field applied along the length of the capillary. The field may urge analyte ions in solution from one end of the capillary to the other with a velocity which is dependent of their electrophoretic mobility. Analyte solution may be introduced electro-kinetically at regular intervals as the separation proceeds, which may produce a multiplexed, convolved data set analogous to that described above in respect of gas phase ion mobility. The multiplexed, convolved data set may be de-convolved as described above.

The methods disclosed herein may be applied to gated Fourier transform ion mobility spectrometry methods (as described above). Instead of the gate frequency being varied, variation of the applied DC field or gas flow may result in the same mobility dependent modulation. Fourier transform or other de-convolution technique may be used to de-convolve (i.e., reconstruct) the mobility spectrum from the frequency of intensity modulation recorded with respect to changing field or gas flow applied.

The method is not limited to a separator having an upstream accumulation region, and may be used with gated drift tubes and/or non-RF-confined drift tubes without pre-accumulation of ions.

The multiplexing techniques described herein may be combined with feedback control of the ion populations accumulated for each impulse of ions into the separator, for example to control space charge effects. Rescaling of intensity may be applied before or after de-convolution based on the known fill time for each ion population released.

The disclosed techniques may be combined with a pseudo random packet timing introduction system of the prior art. For example, in the method described in Anal. Chem. 2007, 79, 2451-2462 (entitled "Multiplexed Ion Mobility Spectrometry-Orthogonal Time-of-Flight Mass Spectrometry"), ions are released into an ion mobility separation region in a pseudo-random sequence, such that the time between release pulses varies. Conventionally, the DC field applied to the separation device is invariant. This method may be modified in accordance with an embodiment of the present disclosure such that, in addition to ions being introduced in a pseudo-random sequence, the magnitude of the DC field applied to the separator is also varied during the separation period. This will produce a complex multiplexed (and convolved) data set, the form of which would depend on both the sequence of ion packet introduction, but also the change in field during the ions progress along the separator device. This system may be analytically modeled to produce model data, or the model data may be experimentally measured using standard compounds of known ion mobility, such that a deconvolution technique may be applied, as described above. This embodiment may be seen as a variant on other embodiments on this disclosure, in that the populations of ions are not introduced into the separator at regular intervals, but in a pseudo-random sequence.

Although the present invention has been described with reference to preferred embodiments, it will be understood by those skilled in the art that various changes in form and detail may be made without departing from the scope of the invention as set forth in the accompanying claims.

The invention claimed is:

1. A method comprising:
   providing a sample to be analysed;
   separating successive populations of ions from said sample in a separator, wherein said populations of ions are introduced into said separator at intervals, and the intervals are timed such that ions in a subsequent population of ions overlap ions in a preceding population of ions, within the separator;
   varying one or more parameters of said separator such that different populations, of said successive populations of ions, experience different separation conditions;
   detecting ions from said populations of ions and obtaining a convolved data set; and
   de-convolving said convolved data set using the known variance of the parameters and outputting data corresponding to the successive populations of ions.

2. A method as claimed in claim 1, wherein the populations of ions are introduced into the separator at a first frequency or in a first pattern, and the populations of ions exit the separator at a second frequency or in a second pattern, wherein the second frequency or second pattern is different to the first frequency or first pattern due to the different separation conditions experienced by each population of ions as they travel through said separator.

3. A method as claimed in claim 1, wherein said one or more parameters substantially affect a transit time of ions through said separator.

4. A method as claimed in claim 1, wherein each successive population of ions contains at least some of the same analyte compounds, and the data corresponding to the successive populations of ions comprises the mass and/or mobility peaks of said analyte compounds.

5. A method as claimed in claim 4, wherein said step of de-convolving said convolved data set comprises using a forward modelling method.

6. A method as claimed in claim 1, further comprising determining the ion mobility and/or collision cross section of ions from said data corresponding to the successive populations of ions.

7. A method as claimed in claim 1, wherein said separator is an ion mobility separator.

8. A method as claimed in claim 7, wherein said one or more parameters comprises one or more of driving force, driving DC voltage, buffer gas velocity, buffer gas composition and buffer gas pressure.

9. A method as claimed in claim 7, wherein said ion mobility spectrometer is a travelling wave ion mobility spectrometer comprising a plurality of electrodes, in which one or more transient DC voltages or potentials are applied to at least some of said electrodes in order to urge ions in a first direction through said ion mobility spectrometer to create a DC travelling wave, and said one or more parameters comprises an amplitude and/or velocity of said DC travelling wave.

10. A method as claimed in claim 7, further comprising mass analysing said ions prior to said step of detecting said populations of ions, wherein said convolved data set comprises ion mobility data nested with mass spectral data.

11. A method as claimed in claim 10, wherein said one or more parameters comprises an applied DC field strength, and said data corresponding to the successive populations of ions comprises a drift time measurement for one or more analyte compounds taken at different average field strengths.

12. A method as claimed in claim 9, further comprising determining a value of collision cross section for each of said analyte compounds using a plot of said drift time measurements against the reciprocal of the average field strength.

13. A method as claimed in claim 1, wherein said separator is configured to separate ions according to their mass to charge ratio.

14. A method as claimed in claim 13, wherein said separator is an orthogonal time of flight mass analyser, and said one or more parameters comprises a voltage associated with said orthogonal time of flight mass analyser that substantially affects the time of flight of ions in said orthogonal time of flight mass analyser.

15. An apparatus for separating and analysing ions, the apparatus comprising an ion separator, a detector and a control system, wherein the control system is arranged and adapted to:
   separate successive populations of ions from a sample, and introduce said populations of ions into a separator at intervals, wherein the intervals are timed such that ions in a subsequent population of ions overlap ions in a preceding population of ions, within the separator;
   vary one or more parameters of said separator such that different populations, of said successive populations of ions, experience different separation conditions;
   detect ions from said populations of ions and obtain a convolved data set; and
   de-convolve said convolved data set using the known variance of the parameters and outputting data corresponding to the successive populations of ions.

16. A method as claimed in claim 1, wherein different ion populations that overlap in the separator are subjected to said different separation conditions.

* * * * *